US008988595B2

United States Patent
Kunieda et al.

(10) Patent No.: US 8,988,595 B2
(45) Date of Patent: Mar. 24, 2015

(54) FOCUS DETECTION APPARATUS, IMAGE PICKUP APPARATUS, IMAGE PICKUP SYSTEM, FOCUS DETECTION METHOD, AND NON-TRANSITORY COMPUTER-READABLE STORAGE MEDIUM

(71) Applicant: Canon Kabushiki Kaisha, Tokyo (JP)

(72) Inventors: Shutaro Kunieda, Yokohama (JP); Takeshi Ogawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/088,884

(22) Filed: Nov. 25, 2013

(65) Prior Publication Data

US 2014/0146218 A1 May 29, 2014

(30) Foreign Application Priority Data

Nov. 29, 2012 (JP) .................. 2012-261392

(51) Int. Cl.
| | |
|---|---|
| *G03B 13/00* | (2006.01) |
| *H04N 5/232* | (2006.01) |
| *H04N 5/228* | (2006.01) |
| *H04N 5/359* | (2011.01) |
| *H04N 5/369* | (2011.01) |

(52) U.S. Cl.
CPC ............ *H04N 5/23212* (2013.01); *H04N 5/359* (2013.01); *H04N 5/3696* (2013.01)
USPC .......... 348/352; 348/222.1; 348/345; 348/349

(58) Field of Classification Search
USPC ...................... 348/222.1, 294, 296, 345–357; 396/72–88
See application file for complete search history.

(56) References Cited

U.S. PATENT DOCUMENTS

| | | | | |
|---|---|---|---|---|
| 6,545,715 | B1 * | 4/2003 | Na ................................ | 348/351 |
| 7,262,804 | B2 * | 8/2007 | Watanabe ..................... | 348/349 |
| 7,652,713 | B2 * | 1/2010 | Yamasaki ..................... | 348/345 |
| 8,223,256 | B2 * | 7/2012 | Kusaka ........................ | 348/349 |
| 2003/0228067 | A1 * | 12/2003 | Miyake et al. ................ | 382/275 |
| 2004/0179128 | A1 * | 9/2004 | Oikawa ........................ | 348/345 |
| 2006/0251410 | A1 * | 11/2006 | Trutna ........................... | 396/55 |
| 2007/0237429 | A1 * | 10/2007 | Kusaka ........................ | 382/312 |

(Continued)

FOREIGN PATENT DOCUMENTS

| | | |
|---|---|---|
| JP | 2001-83407 A | 3/2001 |
| JP | 2007-133087 A | 5/2007 |
| JP | 4691930 B2 | 6/2011 |

*Primary Examiner* — Michael Osinski
(74) *Attorney, Agent, or Firm* — Carter, DeLuca, Farrell & Schmidt, LLP

(57) ABSTRACT

A focus detection apparatus performs focus detection by a phase difference method using an image pickup element including first and second pixels, the focus detection apparatus includes a correlation data calculator which calculates correlation data between pixel data obtained from the first pixels and the second pixels in ranges of image data, a detector which detects a saturated pixel having a level of at least a predetermined value in each of the ranges, an adding processor which performs an addition processing of the correlation data calculated in each of the ranges based on a detection result, and a defocus amount calculator which calculates a defocus amount based on a result of the addition processing, and the adding processor performs the addition processing using correlation data obtained from a first range in which the number of the saturated pixels is less than a predetermined number.

15 Claims, 10 Drawing Sheets

(56) References Cited

U.S. PATENT DOCUMENTS

| | | | |
|---|---|---|---|
| 2007/0237511 A1* | 10/2007 | Kusaka | 396/111 |
| 2007/0258657 A1* | 11/2007 | Kryda et al. | 382/261 |
| 2007/0269127 A1* | 11/2007 | Kusaka | 382/255 |
| 2008/0259202 A1* | 10/2008 | Fujii | 348/345 |
| 2009/0080876 A1* | 3/2009 | Brusnitsyn et al. | 396/128 |
| 2009/0122171 A1* | 5/2009 | Suzuki | 348/294 |
| 2009/0256952 A1* | 10/2009 | Kusaka | 348/349 |
| 2009/0295964 A1* | 12/2009 | Utagawa et al. | 348/302 |
| 2010/0194967 A1* | 8/2010 | Amano | 348/345 |
| 2010/0238343 A1* | 9/2010 | Kawarada | 348/345 |
| 2011/0044678 A1* | 2/2011 | Ogino | 396/124 |
| 2011/0141329 A1* | 6/2011 | Nakagawa | 348/294 |
| 2011/0273581 A1* | 11/2011 | Fujii et al. | 348/222.1 |
| 2012/0147227 A1* | 6/2012 | Yoshimura et al. | 348/246 |
| 2012/0194721 A1* | 8/2012 | Sakaida | 348/302 |
| 2012/0268634 A1* | 10/2012 | Fukuda et al. | 348/302 |
| 2012/0300104 A1* | 11/2012 | Onuki et al. | 348/302 |
| 2013/0002911 A1* | 1/2013 | Miyashita et al. | 348/247 |
| 2013/0021517 A1* | 1/2013 | Ui et al. | 348/345 |
| 2013/0021519 A1* | 1/2013 | Hamada | 348/349 |
| 2013/0063642 A1* | 3/2013 | Nakaoka | 348/308 |
| 2013/0076970 A1* | 3/2013 | Kishi | 348/349 |
| 2013/0076972 A1* | 3/2013 | Okita | 348/360 |
| 2013/0120644 A1* | 5/2013 | Fujii | 348/349 |
| 2013/0155271 A1* | 6/2013 | Ishii | 348/222.1 |
| 2013/0235253 A1* | 9/2013 | Onuki et al. | 348/349 |
| 2013/0271629 A1* | 10/2013 | Sambonsugi | 348/246 |
| 2013/0308040 A1* | 11/2013 | Ishii | 348/353 |
| 2014/0016021 A1* | 1/2014 | Uchida | 348/353 |
| 2014/0022354 A1* | 1/2014 | Okigawa et al. | 348/46 |
| 2014/0036121 A1* | 2/2014 | Minowa et al. | 348/301 |
| 2014/0111677 A1* | 4/2014 | Fukuda | 348/332 |
| 2014/0118610 A1* | 5/2014 | Ohara | 348/349 |
| 2014/0139716 A1* | 5/2014 | Sasaki et al. | 348/311 |
| 2014/0146196 A1* | 5/2014 | Shoda et al. | 348/222.1 |
| 2014/0146197 A1* | 5/2014 | Okuzawa et al. | 348/222.1 |

* cited by examiner

IN-FOCUS STATE

FRONT FOCUS STATE

REAR FOCUS STATE

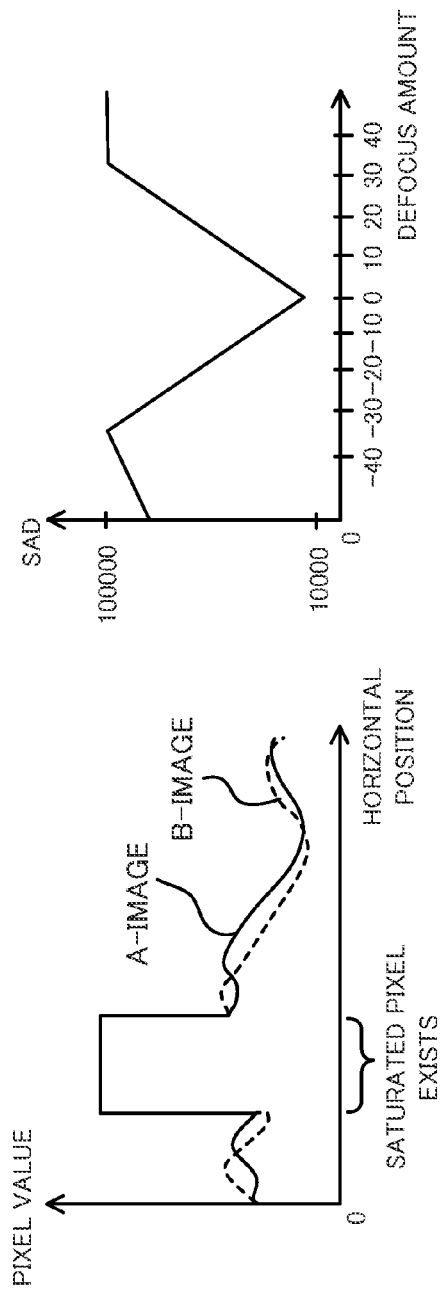
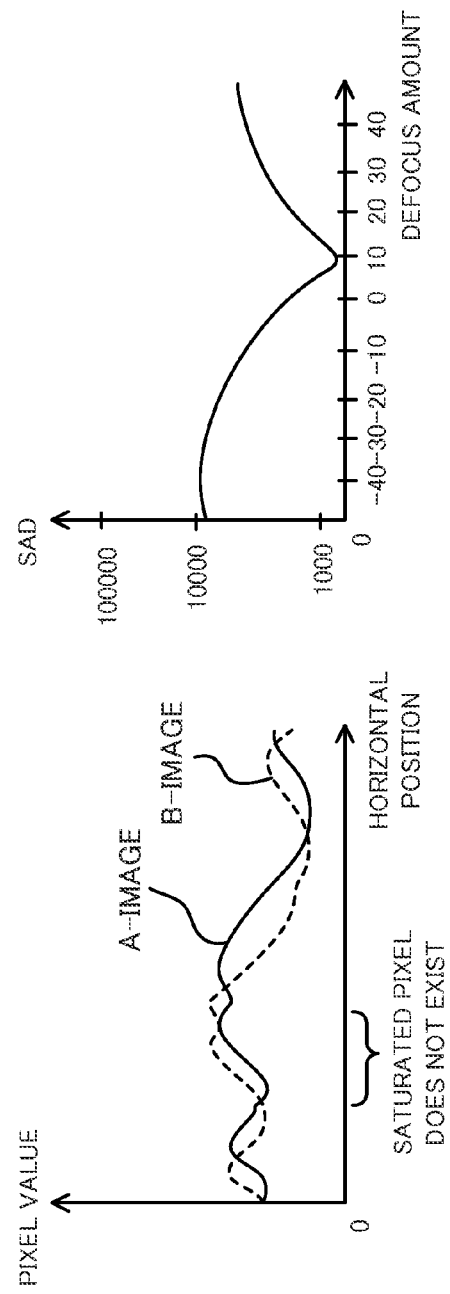
FIG. 10A
FIG. 10B
FIG. 10C
FIG. 10D

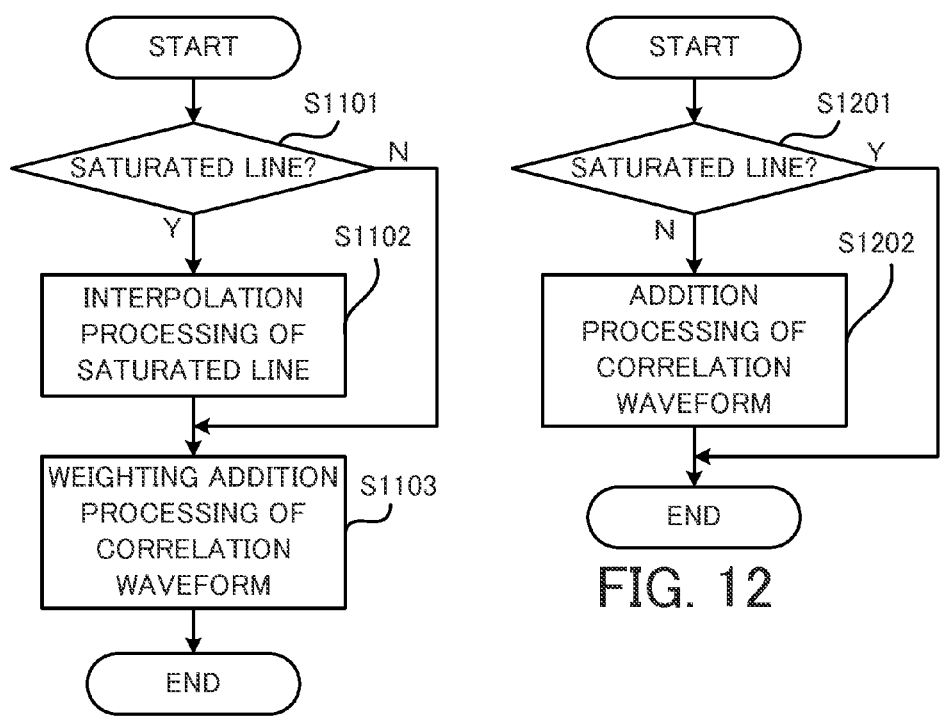

FOCUS DETECTION APPARATUS, IMAGE PICKUP APPARATUS, IMAGE PICKUP SYSTEM, FOCUS DETECTION METHOD, AND NON-TRANSITORY COMPUTER-READABLE STORAGE MEDIUM

BACKGROUND OF THE INVENTION

1. Field of the Invention

The present invention relates to a focus detection apparatus which performs focus detection by a phase difference method using an image pickup element including a plurality of photoelectric conversion portions sharing one microlens.

2. Description of the Related Art

A focus detection method is well known in the related art, in which taking an image and focus detection by a phase difference method are performed using a solid-state image pickup element including a plurality of photoelectric conversion portions sharing one microlens. Japanese Patent Laid-open No. 2001-83407 discloses a configuration in which two photoelectric conversion portions divided with respect to one microlens obtain pupil-divided image signals to perform a focus detection processing by the phase difference method. In addition, Japanese Patent Laid-open No. 2001-83407 discloses a configuration in which a value obtained by adding the outputs of two photoelectric conversion portions corresponding to the same microlens is handled as an output of a pixel to obtain an image signal as an image pickup signal.

Japanese Patent Laid-open No. 2007-133087 discloses a configuration in which image signals from a plurality of photoelectric conversion portions sharing one microlens are selectively read out as an A-image or a B-image to perform a correlation calculation. Japanese Patent No. 4691930 discloses a configuration in which some of a plurality of divided photoelectric conversion portions are read out through a non-destructive readout and then a synthesis component value of each photoelectric conversion portion is read out. Then, the number of readout pixels is reduced by estimating other divided photoelectric conversion portion based on a difference between the synthesis component value and a pixel value of a part of the photoelectric conversion portions.

Since an output value of the image signal as the image pickup signal is generated by using an addition value of the plurality of divided photoelectric conversion portions in the configuration as disclosed in Japanese Patent Laid-open No 2001-83407 and Japanese Patent Laid-open No. 2007-133087, an upper limit value of a light amount allowed to be photo-electrically converted in each photoelectric conversion portion is smaller compared with that of the configuration in which the photoelectric conversion portion is not divided. That is, when light having intensity which exceeds a saturation level is exposed on only one of the photoelectric conversion portions, a charge for the saturation are not reflected in the image signal as the image pickup signal, and therefore the image signal as the image pickup signal is not correctly generated.

In addition, it is considered to calculate a correlation waveform for each of a plurality of ranging regions in which the change of correlation value in a column direction is obtained, from a signal of each pupil-divided pixel of each pixel when performing the focus detection by the phase difference method using the image pickup element. In this case, the plurality of correlation waveforms calculated from the plural ranging regions are added to be able to calculate a shift amount of a focus by obtaining an image shift amount based on the added correlation waveform.

However, when the correlation waveform is calculated in a region including saturated pixels at the time of performing the focus detection by the phase difference method using the image pickup element, the image shift amount obtained based on the correlation waveform becomes zero and an erroneous focus shift amount is calculated, and thus, focus detection accuracy is deteriorated.

BRIEF SUMMARY OF THE INVENTION

The present invention provides a focus detection apparatus, an image pickup apparatus, an image pickup system, and a focus detection method capable of reducing a deterioration of focus detection accuracy even when a saturated pixel is included. The present invention also provides a non-transitory computer-readable storage medium storing a program which causes a computer to execute the focus detection method.

A focus detection apparatus as one aspect of the present invention performs focus detection by a phase difference method using an image pickup element including a plurality of first pixels and a plurality of second pixels, each pair of the first and second pixels sharing one microlens, the focus detection apparatus includes a correlation data calculator configured to calculate correlation data between pixel data obtained from the plurality of first pixels and pixel data obtained from the plurality of second pixels in a plurality of ranges of image data obtained from the image pickup element, a detector configured to detect a saturated pixel having a level of at least a predetermined value in each of the plurality of ranges, an adding processor configured to perform an addition processing of the correlation data calculated in each of the plurality of ranges, based on a detection result of the saturated pixel by the detector, and a defocus amount calculator configured to calculate a defocus amount based on a result of the addition processing, and the adding processor performs the addition processing using correlation data obtained from a first range in which the number of the saturated pixels is less than a predetermined number.

An image pickup apparatus as another aspect of the present invention includes the focus detection apparatus.

An image pickup system as another aspect of the present invention includes the image pickup apparatus and a lens apparatus removably mounted on the image pickup apparatus, and the image pickup apparatus performs a drive control of the lens apparatus based on a signal obtained from the focus detection apparatus.

A focus detection method as another aspect of the present invention performs focus detection by a phase difference method using an image pickup element including a plurality of first pixels and a plurality of second pixels, each pair of the first and second pixels sharing one microlens, the focus detection method includes the steps of calculating correlation data between pixel data obtained from the plurality of first pixels and pixel data obtained from the plurality of second pixels in a plurality of ranges of image data obtained from the image pickup element, detecting a saturated pixel having a level of at least a predetermined value in each of the plurality of ranges, performing an addition processing of the correlation data calculated in each of the plurality of ranges, based on a detection result of the saturated pixel, and calculating a defocus amount based on a result of the addition processing, and the addition processing is performed using correlation data obtained from a range in which the number of the saturated pixels is less than a predetermined number.

A non-transitory computer-readable storage medium as another aspect of the present invention stores a program which causes a computer to execute each step of the focus detection method.

Further features and aspects of the present invention will become apparent from the following description of exemplary embodiments with reference to the attached drawings.

BRIEF DESCRIPTION OF THE DRAWINGS

FIGS. 10A to 10D are diagrams illustrating the correlation waveforms depending on the presence of a saturated pixel in each embodiment.

FIG. 11 is a flowchart illustrating an addition processing of the correlation waveform in Embodiment 1.

FIG. 12 is a flowchart illustrating an addition processing of the correlation waveform in Embodiment 2.

DETAILED DESCRIPTION OF THE PREFERRED EMBODIMENTS

Figure 1:
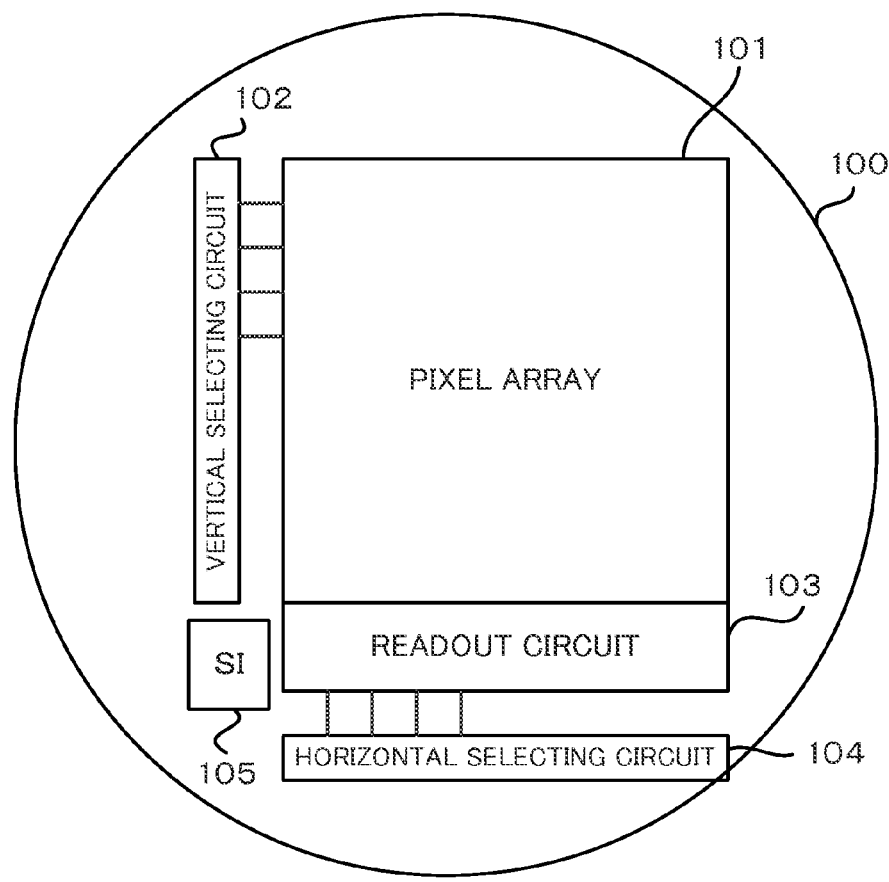
FIG. 1 is a schematic configuration diagram of an image pickup element in each embodiment.

Hereinafter, embodiments of the present invention will be described with reference to the drawings. Note that the same components will be denoted by the same reference numerals to avoid a duplicated description in each drawing.

Embodiment 1

First of all, referring to FIG. 1, a configuration of an image pickup element in Embodiment 1 of the present invention will be described. FIG. 1 is a schematic configuration diagram of the image pickup element in the present embodiment. In FIG. 1, an image pickup element 100 includes a pixel array 101 (a pixel portion), a vertical selecting circuit 102 which selects a row in the pixel array 101, and a horizontal selecting circuit 104 which selects a column in the pixel array 101. In addition, the image pickup element 100 includes a readout circuit 103 which reads out a signal of a pixel selected by the vertical selecting circuit 102 among pixels of the pixel array 101, and a serial interface 105 which externally determines an operation mode of each circuit and the like.

The readout circuit 103 includes components such as a memory for storing the signal, a gain amplifier, and an AD converter for each column. The image pickup element 100 includes a timing generator or a control circuit which provides a timing signal to, for example, the vertical selecting circuit 102, the horizontal selecting circuit 104, or the signal readout portion 103 in addition to the components illustrated in FIG. 1. Typically, the vertical selecting circuit 102 selects sequentially a plurality of rows of the pixel array 101, and the readout circuit 103 reads out the selected pixel signal. The horizontal selecting circuit 104 sequentially selects the plurality of pixel signals read out by the readout circuit 103 for each column.

Figure 2:
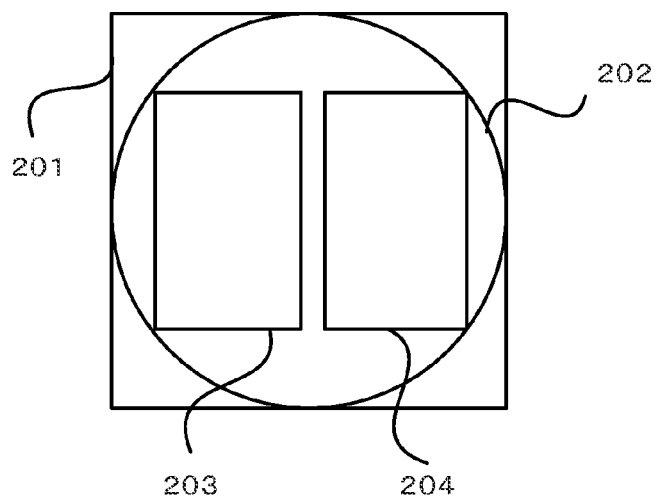
FIG. 2 is a schematic diagram of a pixel of a pixel array in each embodiment.

Subsequently, referring to FIG. 2, a configuration of a pixel in the pixel array 101 will be described. FIG. 2 is a schematic diagram of the pixel in the pixel array 101. Reference numeral 201 denotes one pixel in the pixel array 101. Reference numeral 202 denotes a microlens. The pixel 201 includes the microlens 202. Reference numerals 203 and 204 denote photo diodes. The pixel 201 includes two photo diodes (hereinafter, referred to as a "PD") 203 and 204. Furthermore, the pixel 201 is configured to include, for example, a pixel amplifying amplifier used to have the signals of the PDs 203 and 204 be read out by the column readout circuit 103, a selection switch which selects the row, and a reset switch which resets the signals of the PDs 203 and 204, in addition to the components illustrated in FIG. 2.

Figure 3:
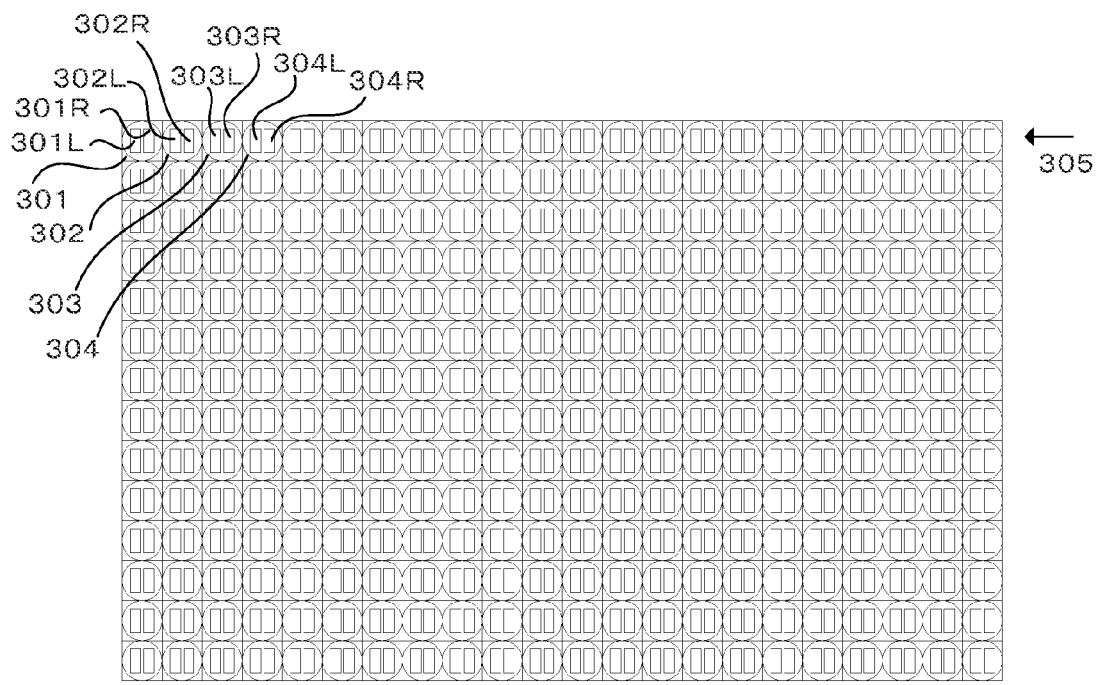
FIG. 3 is a schematic diagram of the pixel array in each embodiment.

Subsequently, referring to FIG. 3, an entire configuration of the pixel array 101 will be described. FIG. 3 is a schematic diagram of the pixel array 101. The pixel array 101 is configured such that a plurality of pixels illustrated in FIG. 2 are arranged in a two-dimensional array to provide a two-dimensional image. Reference numerals 301, 302, 203, and 304 respectively denote pixels. Reference numerals 301L, 302L, 303L, and 304L respectively denote photo diodes (PDs), which correspond to the PD 203 in FIG. 2. Reference numerals 301R, 302R, 303P, and 304R respectively denote photo diodes (PDs) which correspond to the PD 204 in FIG. 2.

Figure 4:
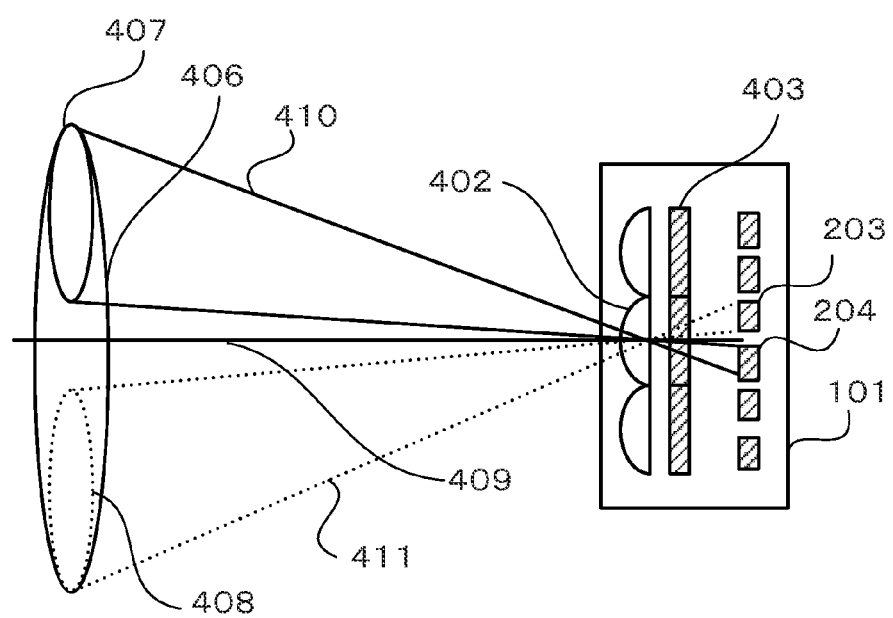
FIG. 4 is a conceptual diagram in which light beam emitted from an exit pupil of an image pickup lens enters an image pickup element in each embodiment.

Next, referring to FIG. 4, a light receiving state in the image pickup element 100 having the pixel configuration illustrated in FIG. 3 will be described. FIG. 4 is a conceptual diagram in which light beam emitted from an exit pupil of an image pickup lens enters the image pickup element 100. In FIG. 4, a cross-section of the pixel array 101 is illustrated. Reference numeral 402 denotes a microlens, and reference numeral 403 denotes a color filter. Reference numeral 406 denotes an exit pupil of the image pickup lens. In the present embodiment, an optical axis 409 is a center of the light beam emitted from the exit pupil 406 with respect to two photo diodes (PDs 203 and 204) sharing one microlens 402. Light emitted from the exit pupil 406 enters the image pickup element 100 around the center of the optical axis 409.

Reference numerals 407 and 408 respectively denote regions (partial regions) of the exit pupil of the image pickup lens different from each other. Reference numeral 410 denotes the outmost ray of light passing through the region 407 of the exit pupil 406. Reference numeral 411 denotes the outmost ray of light passing through the region 408 of the exit pupil 406. As illustrated in FIG. 4, with respect to the light flux emitted from the exit pupil 406, the light beam upper than the optical axis 409 (the light passing through the region 407) enters the PD 204, and the light beam lower than the optical axis 409 (the light passing through the region 408) enters the PD 203. In other words, the PD 203 and PD 204 respectively receive the light passing through the regions (regions 407 and 408) of the exit pupil 406 of the image pickup lens different from each other.

In the present embodiment, as illustrated in FIGS. 2 and 4, the configuration where the microlens 202 (402) shares two photo diodes (PDs 203 and 204) is adopted. However, the present embodiment is not limited to this, and focus detection can be performed by a phase difference method even in a configuration where a certain pixel is only provided with a one-side PD and an adjacent pixel is only provided with an opposite-side PD. In addition, the focus detection can be performed by the phase difference method even in a case where a light blocking layer or the like is provided to block the light entering from one side of the microlens 202. Furthermore, if the image pickup element has a configuration capable of separately (independently) obtaining information on the light beam emitted from the exit pupil 406 of the image pickup lens, and includes two-dimensionally arrayed pixels, the present embodiment is not limited to the configuration described above.

An image pickup apparatus of the present embodiment includes the focus detection apparatus, and obtains images of the regions different from each other of the exit pupil in the image pickup lens by the image pickup element 100 to perform she focus detection by the phase difference method. In other words, the image pickup apparatus (the focus detection apparatus) performs the focus detection by the phase difference method using the image pickup element 100 including a first pixel (PD 202) and a second pixel (PD 203) sharing one microlens 202.

Figure 5:
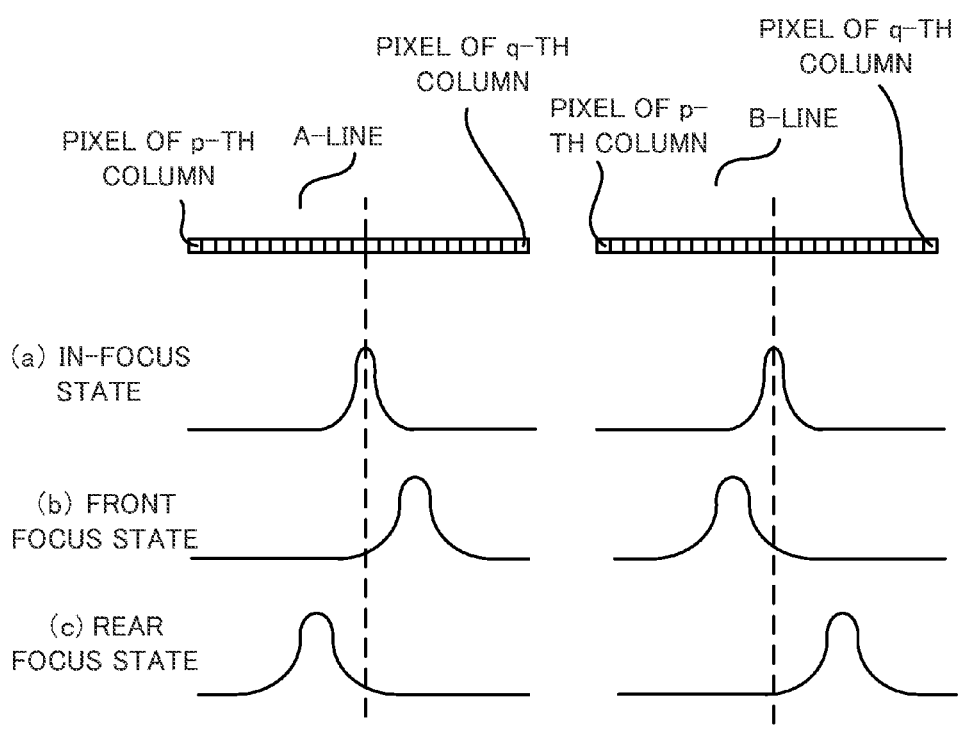
FIG. 5 is a diagram of focus detection by a focus detection apparatus in each embodiment.

Next, referring to FIG. 5 and FIGS. 6A and 6B, a processing of driving the image pickup lens based on a shift amount of two images will be described. First of all, referring to FIG. 5, the focus detection (the ranging operation) by the focus detection apparatus in the present embodiment will be briefly described. FIG. 5 is a diagram of the focus detection by the focus detection apparatus. In FIG. 5, an upper part illustrates a pixel arrangement in which pixels are arranged in one row of a focus detection region (a ranging region) of the image pickup element 100, and a lower part illustrates each image at each focus position in a state where a horizontal axis is a pixel position and a vertical axis is a signal level. In addition, (a) of FIG. 5 illustrates an in-focus state, (b) of FIG. 5 illustrates a front focus state, and (c) of FIG. 5 illustrates a rear focus state. The image pickup element 100 is configured such that A-line pixels and B-line pixels receiving the light emitted from the different exit pupils of the image pickup lens are disposed an two-dimensional array.

Referring to FIG. 3, an A-line (a first pixel array) is configured by PDs 301L, 302L, 303L, and 304L (A-image pixel, or a first pixel) out of a row 305. A B-line (a second pixel array) is configured by PDs 301R, 302R, 303R, and 304R (B-image pixel, or a second pixel). As illustrated in FIG. 5, the outputs of the A-line and B-line change such that intervals (image intervals) of two images are different, in accordance with any one of the in-focus state, the front focus state, and the rear focus state. A focus is adjusted by moving a focus lens of the image pickup lens so that the image interval at the in-focus state is obtained. That is, a moving distance of the focus lens can be obtained by calculating the shift amount of two images.

Subsequently, referring to FIGS. 6A and 6B, the focus detection region (the ranging region) on the image pickup element 100 will be described. FIGS. 6A and 6B are schematic diagrams of the ranging region on the image pickup element 100. FIG. 6A illustrates the ranging region. In the present embodiment, the ranging region (a range of the ranging calculation) is set so as to have an X-direction (a horizontal direction) and a Y-direction (a vertical direction) around a center 601 of the ranging region, and the X-direction is within a range from a p-th column to a q-th column and the Y-direction is within a range from a r-th row to a s-th row. In addition, a shift amount is within a range from −imax to +imax. In the present embodiment, the ranging region where the ranging is possible is a region 603 which is configured to also include the shift amount. In the region 603, the focus detection apparatus compares the output of the A-line with she output of the B-line.

Figure 6A:
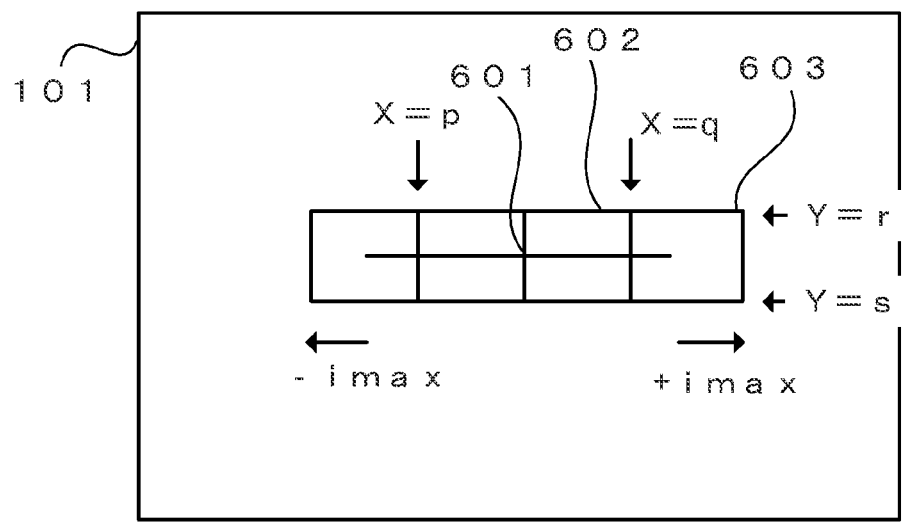
FIGS. 6A and 6B are schematic diagrams of ranging regions of the image pickup element in each embodiment.
Figure 6B:
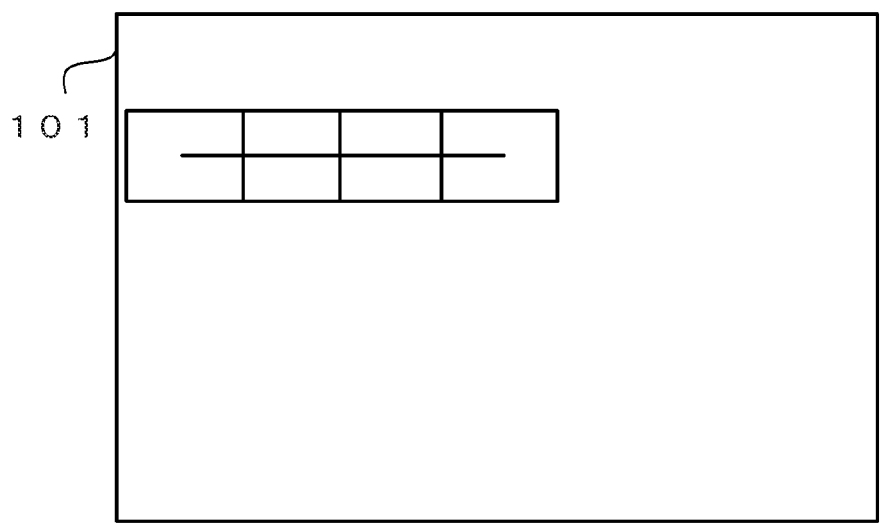

FIG. 6B illustrates a state where the ranging region in the pixel array 101 is set at a position different from that of the ranging region illustrated in FIG. 6A. As illustrated in FIG. 6B, the ranging calculation (the focus detection calculation) can be performed at an arbitrary position on a screen by displacing (by moving) the ranging region.

Figure 7:
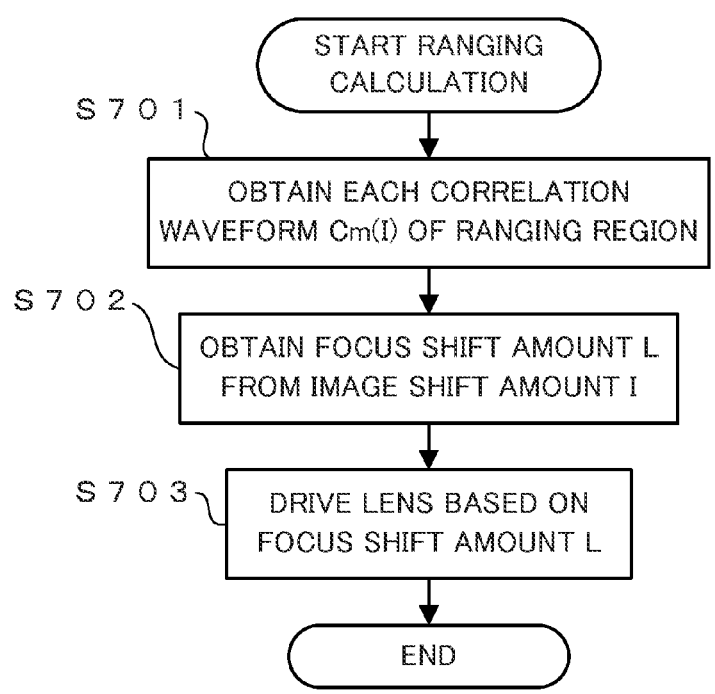
FIG. 7 is a flowchart illustrating a ranging calculation processing in each embodiment.

Next, referring to FIG. 7 to 11, a ranging calculation processing (a focus detection method) in the present embodiment will be described. FIG. 7 is a flowchart illustrating the ranging calculation processing, and illustrates a series of processing from the ranging calculation to the driving of the lens (the image pickup lens). In the present embodiment, a processing within a range of the ranging calculation as illustrated in FIG. 6A is described. Each step in FIG. 7 is performed based on an instruction from a controller (for example, a controller 1309) of the image pickup apparatus (the focus detection apparatus).

Figure 8:
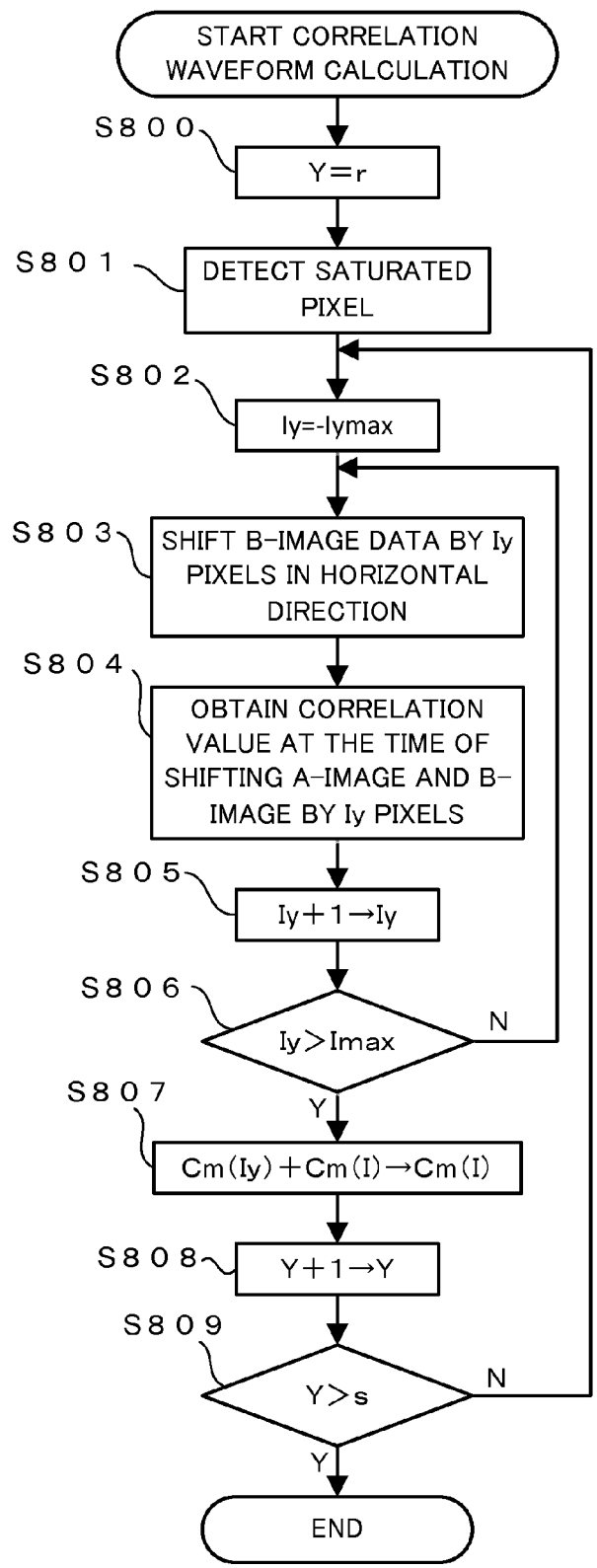
FIG. 8 is a flowchart illustrating a calculation processing of a correlation waveform in each embodiment.

In FIG. 7, when the ranging calculation starts, first of all, in step S701, the process proceeds to a subroutine which calculates a correlation waveform Cm(I) of the ranging region that is a range of the ranging calculation. Referring to FIG. 8, the subroutine of step S701, that is, a calculation method of the correlation waveform Cm(I) will be described. FIG. 8 is a flowchart illustrating the calculation method of the correlation waveform Cm(I) in the ranging region (the focus detection region) illustrated in FIG. 6A, based on image data (an image signal) obtained from the image pickup element 100. Each step in FIG. 8 is performed based on an instruction of the controller (for example, the controller 1309) of the image pickup apparatus (the focus detection apparatus).

In FIG. 8, when the calculation of the correlation waveform starts, first of all, an initial row is selected as Y=r in step S800. Next, saturated pixel detection is performed in step S801. The saturated pixel is determined based on whether each pixel (a signal value of each pixel) reaches a certain saturated level which is previously set. At this time, the controller 1309 (a detector) detects the saturated pixel having a level of at least a predetermined value in each of a plurality of ranges. In step S801, when the pixel reaches the saturated level, the pixel is determined as a saturated pixel and a saturation hit is given to the pixel signal. Furthermore, instead of giving the saturation bit, a part of pixel signals may be treated as a saturation bit, and the polarity thereof may not be restricted.

Next, in step S302, the relation of Iy=−Imax is set. Here, since the row is Y=r, an image shift amount of the r row is obtained. Subsequently, in step S803, image data of the B-image (B-line) are shifted by Iy pixels. Then, in step S304, the correlation value (the correlation waveform) at she time of the Iy pixel shift of the A-image (image data of A-line) and the B-image (image data of B-line) is obtained. Specifically, a correlation value (a correlation waveform Cm(Iy)) is calculated by obtaining an absolute value of a difference between two images (a difference of the image data) in each pixel of the A-line and the B-line, as represented by the following Expression (1).

$$Cm(Iy) = \sum_{x=p}^{q} |A_x - B_{x+Iy}| \tag{1}$$

In Expression (1), A, and B, indicate outputs of x-coordinates of the A-line and the B-line, respectively, in a designated row. That is, Cm(Iy) is a sum of the absolute values of the differences between the image data of the A-line and the image data of the B-line when the B-line in the ranging region "m" is shifted by the Iy pixels.

In addition, the correlation value in the present embodiment is not limited to she calculation using Expression (1), but may be calculated using, for example, the following Expression (2).

$$Cm(Iy) = \sum_{x=p}^{q} |A_{x+Iy} - B_{x-Iy}| \qquad (2)$$

In Expression (2), by not only shifting the image data of the B-line but also concurrently shifting the image data of the A-line in an opposite direction, the sum of the absolute values of the differences between these image data is obtained. In this case, in step S803, the image data of the A-line is shifted by the Iy pixels, and the image data of the B-line is shifted by −Iy pixels.

In addition, the correlation value in the present embodiment can be calculated using a pixel value greater of the pixel values (image data) of each pixel as represented by the following Expression (3), other than the calculation based on the absolute value of the difference between the image data of the A-line and the image data of the B-line.

$$Cm(Iy) = \sum_{x=p}^{q} \max(A_x, B_{x+Iy}) \qquad (3)$$

In Expression (3), max (A, B) represents that the larger value of A and B is selected. Although no specific expression is described herein, it is possible to obtain the correlation value (the correlation waveform) using the calculation in which the smaller value of A and B is selected. Thus, in the present embodiment, the correlation waveform (the correlation data) in each of the plurality of ranges is calculated by relatively displacing (shifting) a first pixel array including a plurality of first pixels and a second pixel array including a plurality of second pixels in a plurality of ranges of the focus detection region (the image data obtained from the image pickup element 100). In other words, correlation data calculator calculates correlation data between pixel data obtained from the plurality of first pixels and pixel data obtained from the plurality of second pixels. The calculation of the correlation waveform is performed by, for example, the controller 1309 (a correlation data calculator) in FIG. 13. In the embodiment, the calculation method of the correlation value in step S804 is not particularly limited.

Next, in step S805, one pixel is displaced by substituting Iy+1 for Iy. Subsequently, in step S806, it is determined whether Iy is greater than Imax (Iy>Imax). When Iy is greater than Imax, the flow proceeds to step S807. On the other hand, when Iy is not more than Imax, the flow returns to step S803 and steps S803 to S805 are repeated.

Next, in step S807, Cm (Iy)+Cm(I) is substituted for the Cm(I). In other words, the controller 1309 (an adding processor) performs the addition processing of the correlation waveform calculated in each of the plurality of ranges of the focus detection region. That is, the adding processor performs the addition processing of the correlation data calculated in each of the plurality of ranges based on the detection result of the saturated pixel by the detector.

Subsequently, in step S808, (Y+1) is substituted for Y to move on one row. Then, in step S809, it is determined whether the relation of Y>s is satisfied. In a case where the relation of Y>s is satisfied, the calculation of the correlation waveform is ended. On the other hand, in a case where the relation of Y>s is not satisfied, the flow returns to step S802 and steps S802 to S808 are repeated. In step S807 of the present embodiment, the correlation waveform Cm(I) is generated by adding the correlation waveform Cm(Iy) of each row. Then, this step is repeatedly performed from the r-th row to the s-th row, the correlation waveform Cm(I) obtained by adding values in all rows is calculated based on the correlation waveform Cm(Iy) of each row.

Figure 9A:
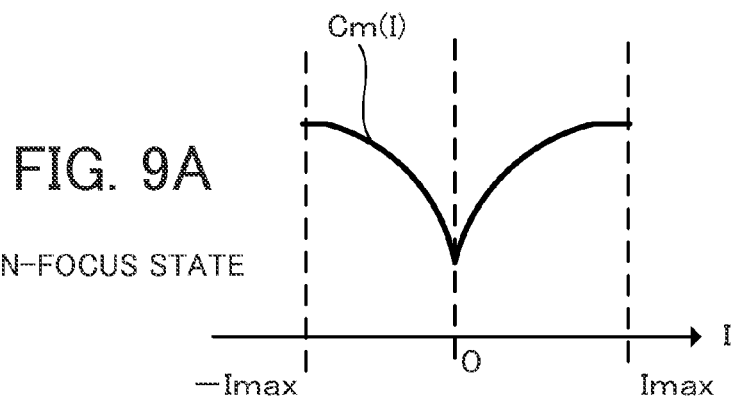
FIGS. 9A to 9C are diagrams illustrating relations between correlation waveforms and focus states in each embodiment.
Figure 9B:
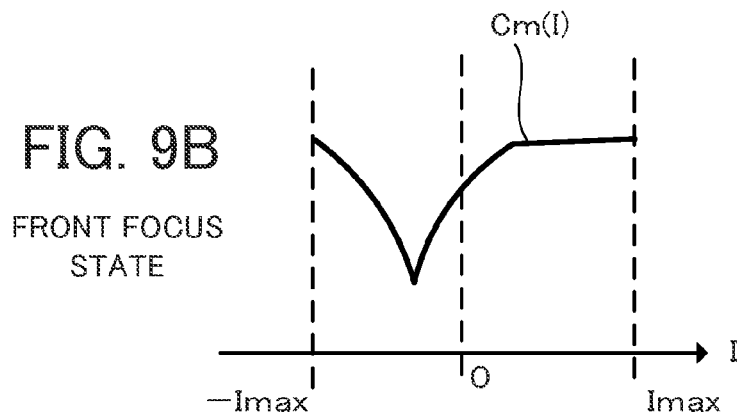
Figure 9C:
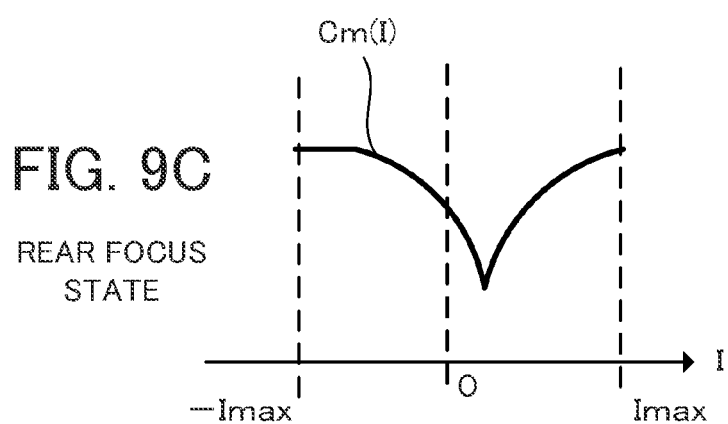

Subsequently, referring to FIGS. 9A to 9C, the correlation waveform will be described. FIGS. 9A to 9C are diagrams of the correlation waveform. FIG. 9A indicates the in-focus state, FIG. 9B indicates the front focus state, and FIG. 9C indicates the rear focus state. The correlation waveform Cm(I) is the correlation value between the image data of the A-line and the image data of the B-line obtained by shifting the lines by a shift amount I. When the sum of the absolute values of the differences between these image data is used to obtain the correlation value, the shift amount I at a location where the output of the correlation waveform Cm(I) is lowest is a shift amount I where the correlation is maximized.

As illustrated in FIG. 9A, the shift amount I where the correlation is maximized in the correlation waveform Cm(I) at the time of the in-focus state is a shift amount (I=0) at a location where the output of the correlation waveform Cm(I) is the lowest. On the other hand, as illustrated in FIGS. 9B and 9C, when the focus state is an out-of-focus state, an image shift amount depending on the shift amount of the focus is the shift amount I. In other words, the shift amount I is equivalent to the image shift amount, and the relation of "shift amount I=image shift amount I" is substantially satisfied.

Next, referring to FIGS. 10A to 10D, step S807 in FIG. 8 will be described in detail. FIG. 10A illustrates a relation between a pixel value (an intensity distribution) of the A-image and the B-image at the line including the saturated pixels in the range 602 of the ranging calculation and a horizontal position. The A-image is indicated by a solid line, and the B-image is indicated by a dotted line. The pixel values of both the A-image and B-image are larger at the line with the saturated pixels.

FIG. 10B illustrates a relation between SAD (sum of absolute differences: plots on a logarithmic scale) at the line including the saturated pixels in the range 602 of the ranging calculation and a defocus amount. The defocus amount is calculated based on the result of the addition processing by the controller 1309 (a defocus amount calculator). The correlation value increases in a zone with the saturated pixel, and the value of SAD becomes smaller at a position where the defocus amount is ±0. However, a total value of SAD is larger due to the influence of the saturated pixel as compared to a line (FIG. 10D) which has no saturated pixel, regardless of the defocus amount.

FIG. 10C illustrates a relation between a pixel value (an intensity distribution) of the A-image and the B-image at the line not including she saturated pixel in the range 602 of the ranging calculation and a horizontal position. FIG. 10D illustrates a relation between the SAD at the line not including the saturated pixel in the range 602 of the ranging calculation and the defocus amount. As illustrated in FIG. 10D, the value of SAD is small when the defocus amount is +10. However, since the value of SAD is not influenced by the saturated pixel, the value of SAD is smaller as compared with the line (FIG. 10B) including the saturated pixel at a position where the defocus amount is +10. Therefore, since the defocus amount becomes zero (0) by adding the correlation waveform of the line including the saturated pixel, the defocus amount to be obtained is a value different from the value of +10. Even in one line, when the addition on processing of the correlation waveform is performed at the line including the saturated pixel, the value of the correlation waveform totally increases, and thus there is a possibility of an erroneous detection of defocusing information.

Next, referring to FIG. 11, the addition processing of the correlation waveform in the present embodiment will be described. FIG. 11 is a flowchart illustrating the addition processing of she correlation waveform. Each step in FIG. 11 is performed based on an instruction of the controller (for example, the controller 1309) of the image pickup apparatus (the focus detection apparatus).

First of all, in step S1101, the controller 1309 (a determination unit) determines whether the saturated pixel are included in the A-line (the first pixel array) or the B-line (the second pixel array) in each of the plurality of ranges of the focus detection region (determination of a saturated line). That is, it is determined whether the saturated pixel is detected in step S801 of FIG. 8. When it is determined that the line is the saturated line, i.e. the saturated pixel is detected, in step S1101, the flow proceeds to step S1102.

In step S1102, the controller 1309 (an adding processor) performs the addition processing using the correlation data (the correlation waveform) obtained from the range in which the number of saturated pixels is less than a predetermined number. In the present embodiment, when the saturated pixel is included in the first pixel array or the second pixel array in a first range (an I-th row) out of the plurality of ranges, the adding processor performs the addition processing so as to reduce the influence of the correlation waveform calculated in the first range. Specifically, in the present embodiment, an interpolation processing of the saturated line is performed for the correlation waveform including the saturated pixel, using the previous or next correlation waveform. With respect to the interpolation processing of the saturated line, in a case of interpolating the correlation waveform for the previous one line, that is, in a case of performing a pre-interpolation, the interpolation is performed as represented by the following Expression (4).

$$Cm(I)=Cm(I-1) \quad (4)$$

Furthermore, in a case of interpolating the saturated line using the correlation waveform for the previous and next one lines, the interpolation is performed as represented by the following Expression (5).

$$Cm(I)=(Cm(I-1)+Cm(I+1))/2 \quad (5)$$

Thus, in the present embodiment, when the saturated pixel is included in the first pixel array or the second pixel array in the first range, the adding processor uses the correlation waveform of the first pixel array or the second pixel, array of the second range adjacent to the first range as a correlation waveform (correlation data) of the first range. In other words, the adding processor uses the correlation data of the first pixel or the second pixel in the second range adjacent to the first range as a correlation data in the first range, for the range in which the number of saturated pixels among the first pixels or the second pixels is at least a predetermined number. For example, when the first range is the I-th row, the second range is the (I+1)-th row or the (I−1)-th row.

In the present embodiment, the interpolation processing of the correlation waveform may also be performed within a range where the saturated pixel exists. In this case, when the saturated pixel is included in the first pixel array or the second pixel array in the first range, the adding processor uses the correlation waveform in the second range adjacent to the first range as a correlation waveform in the first range, for the range where the saturated pixel exists in the first range. In other words, when the saturated pixel is included in the first pixels or the second pixels, the adding processor uses the correlation waveform in the second range adjacent to the first range as a correlation waveform in the first range, for the range where the saturated pixel exists in the first range. For example, it is possible to interpolate the correlation waveform of the zone with the saturated pixel in FIG. 10A using the correlation waveform of the zone without the saturated pixel in FIG. 10C.

Next, in step S1103, a weighting addition processing of the correlation waveform is performed as represented by the following Expression (6).

$$Cm(I)=Cm(I)+k \times Cm(Iy) \quad (6)$$

In Expression (6), k denotes a coefficient of a weighting addition and takes a value between 0.0 and 1.0.

In this case, when the saturated pixel is included in the first pixel array or the second pixel array in the first range, the adding processor performs the addition processing by multiplying the coefficient k (a weight) depending on the number of saturated pixels by the correlation waveform in the first range. It is preferred that the coefficient k comes closer to the value of one as the number of the saturated pixels is smaller, and that the coefficient k comes closer to the value of zero as the number of the saturated pixels is larger. When all of the pixels in a certain line are the saturated pixels as a result of the detection of the saturated pixels in step S801 of FIG. 8, the coefficient k may also be zero.

In the present embodiment, the first pixels (A-image pixels) and the second pixels (B-image pixels) receive the light beam passing through the regions different from each other in a pupil dividing direction of the exit pupil to generate the signal to be used for the calculation of the correlation waveform. Then, the adding processor adds each of the correlation waveforms of the plurality of ranges in a direction orthogonal to the pupil dividing direction. In the present embodiment, the pupil dividing direction of the A-image and the B-image is defined as a row direction and the adding direction of the correlation waveform is defined as a column direction, but the embodiment is not limited to this. Conversely, the pupil dividing direction of the A-image and the B-image may also be defined as a column direction, and the adding direction of the correlation waveform may also be defined as a row direction.

When obtaining the optimal image shift amount I by calculating the correlation waveform Cm(I) in step S701 of FIG. 7 (when the calculation processing of the correlation waveform in FIG. 8 is ended) the flow proceeds to step S702. In step S702, the optimal image shift amount I calculated in step S701 is converted to obtain a focus shift amount L. The image shift amount I can be converted into the focus shift amount L by multiplying or adding coefficients for each F number. Subsequently, in step S703, a lens driving portion (not illustrated) of the image pickup apparatus drives the lens (the image pickup lens) based on the focus shift amount L calculated in step S702 and then the ranging calculation processing is ended.

According to the present embodiment, an SN ratio is improved and the defocus amount can be calculated by performing the weighting addition or the interpolation of the saturated portion of correlation waveform when adding the correlation waveform depending on each line in which the saturated pixel is detected.

Embodiment 2

Next, an image pickup apparatus and a focus detection apparatus in Embodiment 2 of the present invention will be described. In the present embodiment, the descriptions with reference to FIGS. 1 to 10 are the same as that of Embodiment 1, and therefore the descriptions thereof will be omitted.

Referring to FIG. 12, an addition processing of a correlation waveform, in the present embodiment will be described. FIG. 12 is a flowchart illustrating the addition processing of the correlation waveform. Each step of FIG. 12 is performed based on an instruction of a controller of the image pickup apparatus (the focus detection apparatus).

First of all, in step S1201, the determination of the saturated line is performed. In other words, in step S801 of FIG. 8, it is determined whether a saturated pixel is detected or not. In step S1201, when it is determined that the line is not the saturated line, i.e. when the saturated pixel is not detected, the addition processing of the correlation waveform is performed in step S1202, as represented by the following Expression (7).

$$Cm(I)=Cm(I)+Cm(Iy) \quad (7)$$

On the other hand, in step S1201, when it is determined that the line is the saturated line, i.e. at least a predetermined number (a predetermined ratio) of the saturated pixels is detected, a value of SAD of the correlation waveform for the saturated line is large, and therefore the addition processing of the correlation waveform is not performed. Thus, when at least the predetermined number (the predetermined ratio) of the saturated pixels is included in a first pixel array or the second pixel array of the first range, a controller 1309 (an adding processor) perform the addition processing without using the correlation waveform in the first range. In other words, the adding processor performs the addition processing using the correlation data obtained from the range in which the number of saturated pixels is less than a predetermined number.

As described above, in the present embodiment, when the correlation waveform is added in accordance with the line in which the saturated pixel is detected in a ranging region including the saturation pixel, the correlation waveform is normally added for the line where the number (a ratio) of the saturated pixels is less than a predetermined number (a predetermined ratio), and on the other hand, the correlation waveform is not added for the line where the number (the ratio) of the saturated pixels is not less than the predetermined number (the predetermined ratio). Therefore, a defocus amount in which the saturated line is excluded to improve an SN ratio can be calculated.

(Application to Image Pickup System)

Figure 13:
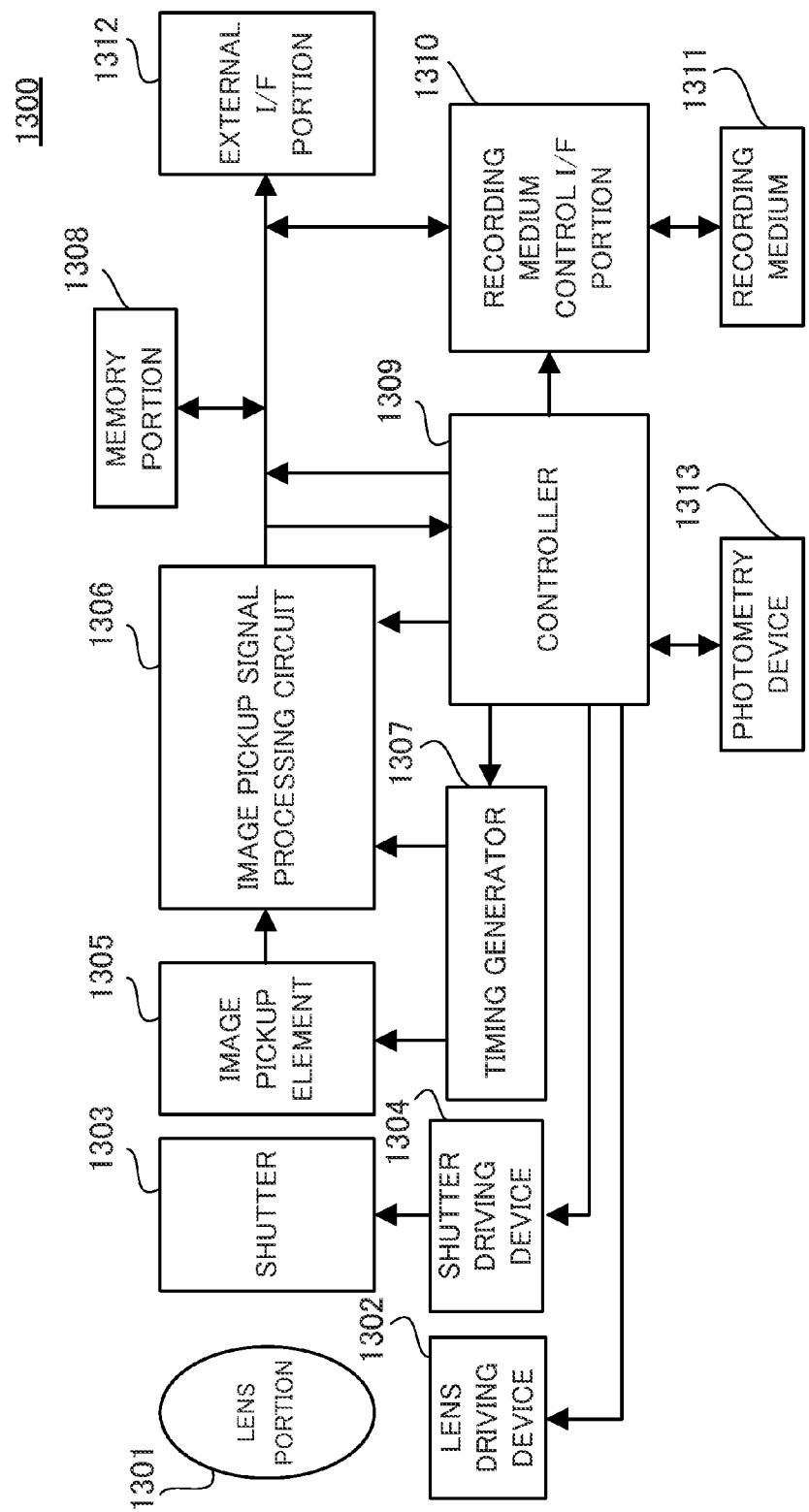
FIG. 13 is a schematic diagram of an image pickup system in each embodiment.

Next, referring to FIG. 13, an image pickup system to which the image pickup apparatus in each embodiment is applicable will be described. FIG. 13 is a schematic diagram of the image pickup system 1300.

In FIG. 13, reference numeral 1301 denotes a lens portion (a lens apparatus) which forms an optical image of an object on an image pickup element 1305 (a solid-state image pickup element). The lens portion 1301 performs a zoom control, a focus control, a aperture stop control, or the like, using a lens driving device 1302. Reference numeral 1303 denotes a mechanical shutter. The mechanical shutter 1303 is controlled by a shutter controller 1304.

Reference numeral 1305 denotes an image pickup element which takes the object imaged by the lens portion 1301, as an image signal. Reference numeral 1306 denotes an image pickup signal processing circuit which performs various kinds of corrections for the image signal output from the image pickup element 1305 and compresses data. Reference numeral 1307 denotes a timing generating circuit as a driving portion which outputs various kinds of timing signals to the image pickup element 1305 and the image pickup signal processing circuit 1306. Reference numeral 1309 denotes a controller which controls various kinds of calculation operations and the entire image pickup apparatus. Reference numeral 1308 is a memory portion (a storage portion) for temporarily storing image data. Reference numeral 1310 denotes an interface which records on or reads out from a recording medium. Reference numeral 1311 denotes a detachable recording medium, such as a semiconductor memory, which is configured to record or read out the image data. Reference numeral 1312 denotes a display portion which displays various kinds of information or shot images.

Next, an image pickup operation of a digital camera an image pickup system 1300) in the configuration described above will be described. When a main power supply is turned on, a power supply of a control system is turned on, and the power supply of an image pickup system circuit such as the image pickup signal processing circuit 1306 is turned on. Subsequently, when a release button (not illustrated) is pressed, the controller 1309 performs a ranging calculation based on the data from the image pickup element 1305 and calculates a distance to the object based on the ranging result. Then, the lens driving device 1302 drives the lens portion 1301 and determines whether the focus state is the in-focus state. When it is determined that the focus state is not the in-focus state, the lens portion 1301 is again driven to perform the ranging (the focus detection). The ranging calculation is obtained by the data from the image pickup element 1305, or alternatively may also be performed by a dedicated ranging apparatus (not illustrated).

Then, an image shooting operation starts after the in-focus state is confirmed. When the image shooting operation ends, the image pickup signal processing circuit 1306 performs an image processing for the image signal output from the image pickup element 1305, and the controller 1309 writes the processed image signal in the memory portion 1308. The image pickup signal processing circuit 1306 performs rearrangement processing, addition processing, and selection processing thereof. The data accumulated in the memory portion 1308 is recorded on the detachable recording medium 1311, such as a semiconductor memory, through a recording medium control I/F portion 1310 according to the control by the controller 1309. In addition, the data may be directly input to the computer or the like through an external I/F portion (not illustrated) to perform the image processing. The image pickup system 1300 is configured to include the image pickup apparatus (the image pickup apparatus body) and the lens portion 1301 (a lens apparatus) removably mounted on the image pickup apparatus, and the image pickup apparatus controls the driving of the lens portion 1301 based on the signal obtained from the focus detection apparatus in each embodiment. Each embodiment is not limited to this, and the image pickup apparatus body and the lens portion may be integrally configured.

According to each embodiment, a focus detection apparatus, an image pickup apparatus, an image pickup system, and a focus detection method capable of reducing the deterioration of the focus detection accuracy even when a saturated pixel is included can be provided.

Particularly, the image pickup apparatus of each embodiment uses each signal (independent signals) of the first pixel (A-image pixel) and the second pixel (B-image pixel) of image pickup apparatus as an image detection signal, and uses the adding signal of the first pixel and the second pixel as an image pickup signal. In order to obtain a shot image with higher quality in such apparatus, the shot image with high quality can be obtained by actively moving electric charges to the other side when one of the first pixel or the second pixel approaches the saturation. Therefore, it is preferred that the image pickup element adopts a structure which is configured, for example, to lower the potential between the first pixel and the second pixel. Such structure increases a possibility that both the first pixel and the second pixel are saturated. When photoelectric conversion portions of both the first pixel and the second pixel are saturated, it may be a greatly erroneous factor when the focus detection is performed. Therefore, when the saturated pixel is included in both the first pixel array and the second pixel array, the adding processor preferably performs the addition processing so as to reduce influence of the correlation waveform calculated in the first range. In this way, each embodiment is particularly effective to the image pickup apparatus (the image pickup element) having the configuration described above.

Furthermore, the following embodiment may be also applied. Based on the divided PDs 203 and 204 sharing the same microlens 202, it is possible to add the accumulated electric charges to read out, and the accumulated electric charges can be also read out selectively on each divided PDs 203 and 204 in non-destructive manner. At this time, first of all, from the image pickup element 100, a non-destructive readout of the A-image pixel signals for one horizontal line, that is, a nondestructive readout of the divided pixel signals from the divided PD 203 is performed. Subsequently, from the image pickup element 100, the readout of the adding signal of the A-image pixel signal and the B-image pixel signal on the same line, that is, the readout of a unit pixel signal from the divided PDs 203 and 204 is performed. Then, the controller 1309 illustrated in FIG. 13 performs the saturation detection of a predetermined value or more as in step S801 and the readout control of these signals from the image pickup element 100. At this time, the A-image signal serving as the pixel signal is output to the image pickup signal processing circuit 1306 at the time of the readout of the A-image pixel, and the image pickup signal processing circuit 1306 detects the saturation of the A-image pixel. On the other hand, (A+B) image signal serving as the pixel signal is output to the image pickup signal processing circuit 1306 at the time of the readout of the capturing pixel. The brightness signal of the B-image pixel can be obtained by a difference between the brightness signal obtained from the pixel signal of the A-image pixel corresponding to a plurality of color filters and the (A+B) image, and the saturation detection of the B-image pixel signal is detected by the saturation detection of the brightness signal of the B-image pixel. By the saturation detection described above, the saturation detection of the A-image pixel signal, the saturation detection of the B-image pixel signal, and the saturation detection of the (A+B) image signal can be performed, and thus the error of the correlation waveform due to any cause can be also suppressed.

OTHER EMBODIMENTS

The purpose of the present invention can be achieved even when the following embodiment is applied. That is, the invention provides a system or apparatus with a non-transitory computer-readable storage medium that stores program codes of software described with a procedure for realizing the function of each embodiment described above. In this way, the computer (CPU, MPU, or the like) of the system or apparatus executes operation by reading out the program codes that are stored in the storage medium.

In this case, the program codes itself read out from the storage medium implement the novel functions of the invention, and thus the program and the storage medium that stores the program codes are included in the configuration of the present invention.

As the storage medium for providing the program codes, for example, there are a flexible disk, a hard disk, an optical disk, a magneto-optical disk, and the like. In addition, a CD-ROM, a CD-R, a CD-RW, a DVD-ROM, a DVD-RAM, a DVD-RW, a DVD-R, a magnetic tape, a non-volatile memory card, a ROM and the like can be used as the storage medium.

When the program codes read out by the computer are executable, the functions of each embodiment described above are implemented. Furthermore, a case in which the OS (operating system) running on the computer and the like performs a part or all of actual processing based on the instructions of the program codes to implement the functions of each embodiment described above is also included.

In addition, a following case is also included. First, the program, codes read out from the storage medium are written in a memory provided in a function expansion unit connected to the computer or a function expansion board inserted in the composer. Thereafter, based on the instructions of the program codes, the CPU and the like provided in the function expansion board and the function expansion unit performs a part or all of actual processing.

Furthermore, the present invention is applicable not only to the apparatus such as a digital camera which is used for the capturing as main purpose, but also to an arbitrary apparatus which is embedded or connected with respect to the image pickup apparatus such as a cellular phone, a personal computer (laptop-type, desktop-type, tablet-type, or the like), and a game machine. Accordingly, in this specification, the "image pickup apparatus" is intended to include an arbitrary electronic apparatus provided with the image pickup function.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-261392, filed on Nov. 29, 2012, which is hereby incorporated by reference herein in its entirety.

What is claimed is:

1. A focus detection apparatus which performs focus detection by a phase difference method using an image pickup element including a plurality of first pixels and a plurality of second pixels, each pair of the first and second pixels sharing one microlens, the focus detection apparatus comprising:
   a correlation data calculator configured to calculate correlation data between pixel data obtained from the plurality of first pixels and pixel data obtained from the plurality of second pixels in a plurality of ranges of image data obtained from the image pickup element;
   a detector configured to detect a saturated pixel having a level of at least a predetermined value in each of the plurality of ranges;
   an adding processor configured to perform addition processing of the correlation data calculated in each of the plurality of ranges, based on a detection result of the saturated pixel by the detector; and
   a defocus amount calculator configured to calculate a defocus amount based on a result of the addition processing,
   wherein the adding processor performs the addition processing using correlation data obtained from the plurality of ranges in which a number of the saturated pixels is less than a predetermined number.

2. The focus detection apparatus according to claim 1, wherein the adding processor uses the correlation data in a range adjacent to a saturated range as correlation data in the saturated range, for the saturated range in which the number of the saturated pixels among the first pixels or the second pixels is not less than the predetermined number.

3. The focus detection apparatus according to claim 2, wherein when the saturated pixel exists in the first pixels or the second pixels, the adding processor uses the correlation data in the range adjacent to a range of the saturated range as the correlation data in the range of the saturated range, for the range in which the saturated pixel exists in the saturated range.

4. The focus detection apparatus according to claim 1, wherein when the saturated pixel is included in a first pixel array including the plurality of first pixels or a second pixel array including the plurality of second pixels, the adding processor performs the addition processing by multiplying a weight depending on she number of the saturated pixels by the correlation data in each of the plurality of the ranges.

5. An image pickup apparatus comprising the focus detection apparatus according to claim 1.

6. The image pickup apparatus according to claim 5, wherein the first pixel and the second pixel receive light beams passing through different regions of an exit pupil different from each other in a pupil dividing direction so as to generate signals to be used to calculate the correlation data, and
wherein the adding processor adds the correlation data of each of the plurality of ranges in a direction orthogonal to the pupil dividing direction.

7. An image pickup system comprising:
an image pickup apparatus according to claim 5; and
a lens apparatus configured to be removably mounted on the image pickup apparatus,
wherein the image pickup apparatus performs a drive control of the lens apparatus based on a signal obtained from the focus detection apparatus.

8. A focus detection method of performing focus detection by a phase difference method using an image pickup element including a plurality of first pixels and a plurality of second pixels, each pair of the first and second pixels sharing one microlens, the focus detection method comprising:
calculating correlation data between pixel data obtained from the plurality of first pixels and pixel data obtained from the plurality of second pixels in a plurality of ranges of image data obtained from the image pickup element;
detecting a saturated pixel having a level of at least a predetermined value in each of the plurality of ranges;
performing addition on processing of the correlation data calculated in each of the plurality of ranges, based on a detection result of the saturated pixel; and
calculating a defocus amount based on a result of the addition processing,
wherein the addition processing is performed using correlation data obtained from a range in which a number of the saturated pixels is less than a predetermined number.

9. A non-transitory computer-readable storage medium which stores a program to cause a computer to execute each step of the focus detection method according to claim 8.

10. A focus detection apparatus which performs focus detection by a phase difference method using an image pickup element including a plurality of first pixels and a plurality of second pixels, each pair of the first and second pixels sharing one microlens, the focus detection apparatus comprising:
a correlation data calculator configured to calculate correlation data between pixel data obtained from the plurality of first pixels and pixel data obtained from the plurality of second pixels in a plurality of lines of image data obtained from the image pickup element;
a detector configured to detect a saturated pixel having a level of at least a predetermined value in each of the plurality of lines;
an adding processor configured to perform addition processing of the correlation data calculated in each of the plurality of lines, based on a detection result of the saturated pixel by the detector; and
a defocus amount calculator configured to calculate a defocus amount based on a result of the addition processing,
wherein the adding processor performs the addition processing using correlation data obtained from the plurality of lines in which a number of the saturated pixels is less than a predetermined number.

11. A focus detection apparatus which performs focus detection by a phase difference method using an image pickup element including a plurality of first pixels and a plurality of second pixels, each pair of the first and second pixels sharing one microlens, the focus detection apparatus comprising:
a correlation data calculator configured to calculate correlation data between pixel data obtained from the plurality of first pixels and pixel data obtained from the plurality of second pixels;
a detector configured to detect a saturated pixel having a level of at least a predetermined value in each of a plurality of ranges; and
a defocus amount calculator configured to calculate a defocus amount based on statistics of the correlation data,
wherein the statistics of the correlation data is calculated based on correlation data obtained from pixel data other than the saturated pixel detected by the detector.

12. A focus detection apparatus which performs focus detection by a phase difference method using an image pickup element including a plurality of first pixels and a plurality of second pixels, each pair of the first and second pixels sharing one microlens, the focus detection apparatus comprising:
a correlation data calculator configured to calculate correlation data between pixel data obtained from the plurality of first pixels and pixel data in a plurality of ranges of image data obtained from the plurality of second pixels;
a detector configured to detect a saturated pixel having a level of at least a predetermined value in each of the plurality of ranges; and
a defocus amount calculator configured to calculate a defocus amount based on statistics of the correlation data,
wherein the statistics of the correlation data is calculated based on correlation data, of the plurality of ranges, multiplied by a weight depending on a number of the saturated pixels in each of the plurality of ranges.

13. A focus detection method of performing focus detection by a phase difference method using an image pickup element including a plurality of first pixels and a plurality of second pixels, each pair of the first and second pixels sharing one microlens, the focus detection method comprising:
calculating correlation data between pixel data obtained from the plurality of first pixels and pixel data obtained from the plurality of second pixels in a plurality of lines of image data obtained from the image pickup element;

detecting a saturated pixel having a level of at least a predetermined value in each of the plurality of lines;

performing addition processing of the correlation data calculated in each of the plurality of lines, based on a result of detecting the saturated pixel; and calculating a defocus amount based on a result of the addition processing, wherein the addition processing is performed using correlation data obtained from the plurality of lines in which a number of the saturated pixels is less than a predetermined number.

14. A focus detection method of performing focus detection by a phase difference method using an image pickup element including a plurality of first pixels and a plurality of second pixels, each pair of the first and second pixels sharing one microlens, the focus detection method comprising:

calculating correlation data between pixel data obtained from the plurality of first pixels and pixel data obtained from the plurality of second pixels;

detecting a saturated pixel having a level of at least a predetermined value in each of a plurality of ranges; and calculating a defocus amount based on statistics of the correlation data, wherein the statistics of the correlation data is calculated based on correlation data obtained from pixel data other than the saturated pixel detected by the detection.

15. A focus detection method of performing focus detection by a phase difference method using an image pickup element including a plurality of first pixels and a plurality of second pixels, each pair of the first and second pixels sharing one microlens, the focus detection method comprising:

calculating correlation data between pixel data obtained from the plurality of first pixels and pixel data in a plurality of ranges of image data obtained from the plurality of second pixels;

detecting a saturated pixel having a level of at least a predetermined value in each of the plurality of ranges; and calculating a defocus amount based on statistics of the correlation data, wherein the statistics of the correlation data is calculated based on correlation data, of the plurality of ranges, multiplied by a weight depending on a number of the saturated pixels in each of the plurality of ranges.

* * * * *